(12) United States Patent
Matros et al.

(10) Patent No.: US 6,314,722 B1
(45) Date of Patent: Nov. 13, 2001

(54) METHOD AND APPARATUS FOR EMISSION CONTROL

(75) Inventors: Yurii Sh. Matros, Chesterfield; Grigori A. Bunimovich, St. Louis; Vadim O. Strots, Clayton, all of MO (US)

(73) Assignee: Matros Technologies, Inc., Chesterfield, MO (US)

( * ) Notice: Subject to any disclaimer, the term of this patent is extended or adjusted under 35 U.S.C. 154(b) by 0 days.

(21) Appl. No.: 09/413,669

(22) Filed: Oct. 6, 1999

(51) Int. Cl.$^7$ ................................................. F01N 3/00
(52) U.S. Cl. .................... 60/274; 60/286; 60/295; 60/296; 60/297; 422/169; 422/173
(58) Field of Search ................... 60/285, 286, 295, 60/296, 297; 422/169, 170, 171, 172, 173, 174, 175, 177

(56) References Cited

U.S. PATENT DOCUMENTS

| | | | | |
|---|---|---|---|---|
| 2,898,202 | * | 8/1959 | Houdry et al. | 60/296 |
| 2,946,651 | * | 7/1960 | Houdry | 60/296 |
| 3,072,457 | * | 1/1963 | Bloch | 60/296 |
| 3,867,508 | * | 2/1975 | Hass | 60/296 |
| 4,902,487 | | 2/1990 | Cooper et al. . | |
| 4,916,897 | * | 4/1990 | Hayashi et al. | 60/296 |
| 5,433,933 | | 7/1995 | Eshita et al. . | |
| 5,540,897 | * | 7/1996 | Chu et al. | 422/177 |
| 5,665,318 | | 9/1997 | Rembold et al. . | |
| 5,700,747 | | 12/1997 | Kyogoku et al. . | |
| 5,701,735 | * | 12/1997 | Kawaguchi | 60/296 |
| 5,733,837 | | 3/1998 | Nakatsuji et al. . | |
| 5,766,562 | | 6/1998 | Chattha et al. . | |
| 5,768,888 | | 6/1998 | Matros et al. . | |
| 5,776,423 | | 7/1998 | Freeley et al. . | |
| 5,788,936 | | 8/1998 | Subramanian et al. . | |
| 5,833,932 | | 11/1998 | Schmelz . | |
| 5,876,680 | | 2/1999 | Chattha et al. . | |
| 5,882,607 | | 3/1999 | Miyadera et al. . | |
| 5,884,474 | * | 3/1999 | Topsøe | 60/296 |
| 5,884,476 | | 3/1999 | Hirota et al. . | |
| 5,894,013 | | 4/1999 | Takada et al. . | |
| 5,894,068 | | 4/1999 | Kharas et al. . | |
| 5,907,950 | | 6/1999 | Enderle et al. . | |
| 5,908,806 | | 6/1999 | Kharas . | |

OTHER PUBLICATIONS

G. A. Bunimovich, V. O. Strots, Yu. Sh. Matros, E. A. Mirosh, "Reversed Flow Converter: Fundamentals of the Design", SAE paper 1999–01–0459.

Yu. Sh. Matros, G. A. Bunimovich, V. O. Strots, E. A. Mirosh, Reversed flow converter for emission control after automotive engines, Chemical Engineering Science, 54 (1999), 2889–2898.

(List continued on next page.)

Primary Examiner—Thomas Denion
Assistant Examiner—Tu M. Nguyen
(74) Attorney, Agent, or Firm—Grace J. Fishel

(57) ABSTRACT

A converter for purifying exhaust gases from lean-burn engines, in particular for controlling the amount of $NO_x$ and soot from a diesel engine in transient operation such as a vehicle. The converter contains a catalyst bed with a catalyst effective for $NO_x$ reduction with a chemical reductant when the catalyst bed is with a certain temperature window and when the ratio between the molar amount of chemical reductant and $NO_x$ is above a certain minimum ratio. The catalyst bed is heated or cooled to a temperature within the temperature window and a switching valve is provided for reverse flowing the exhaust gases through the converter to maintain the catalyst bed at a temperature within the temperature window for a longer time than is possible with a conventional non-flow-reversing converter. A reductant delivery system adds chemical reductant to the exhaust gases in an appropriate amount so that the ratio between the molar amount of chemical reductant and $NO_x$ is above the certain minimum ratio when the exhaust gases pass over the catalyst bed. A soot trap may be provided in series with the catalyst bed in the converter, said reverse flowing of the exhaust gases through converter heating and continuously maintaining the soot trap at or above the ignition temperature of the soot.

16 Claims, 8 Drawing Sheets

OTHER PUBLICATIONS

M. Zheng, E. A. Mirosh, W. Klopp, D. Ulan, M. Pardell, P. Newman, Yu. Sh. Matros, G. A. Bunimovich, "Development of a Compact Reverse–Flow Catalytic Converter for Diesel Dual Fuel LEV", SAE paper FL–288.

Yu. Sh. Matros and G. A. Bunimovich, "Reverse flow operation in fixed bed catalytic reactors", Catalysis Review—Science Engineering, 38 (1996), 1–68.

T. Nakatsuji, R. Yasukawa, K. Tabata, K. Ueda, M. Niwa, "Catalytic reduction of $NO_x$ in exhaust gas from diesel engines with secondary fuel injection." Applied catalysis, B: Environmental 17 (1998), 333–335.

J. P. Day, "Substrate Effects on Light–Off—Part II, Cell Shape Contribution", SAE paper 971024, 1997.

G. P Ansell, P. S. Bennet, J. P. Cox, J. C. Frost, P. G. Gray, A.–M. Jones, R. R. Rajaram, A. P. Walker, M. Litorell, G. Smelder, "The development of a model cpable of predicting diesel lean $NO_x$ catalyst performance under transient conditions", Applied Catalysis B: Environmental 10 (1996), 183–201.

H. Klein, S. Lopp, E. Lox, M. Kawanami, M. Horiuchi, Hydrocabon $DeNO_x$ Catalysis—System Development for Diesel Passenger Cars and Trucks, SAE paper 1999–01–0109.

A. G. Konstandopoulos and M. Kostoglou, "Periodically Reversed Flow Regeneration of Diesel Particulate Traps", SAE paper 1999–01–0469.

A. Obuchi, I. Kaneko, J. Oi, A. Ohi, A. Ogata, G. R. Bamwenda and S. Kushiyama, "A practical scale evaluation of catalysis for the selective reduction of $NO_x$ with organic substances using a diesel exhaust", Applied Catalysis, B: Environmental 15 (1998), 37–48.

M. Iwamoto, T. Zengyo, A. M. Hernandez, H. Araki, Intermediate addition of reductant between an oxidation and a reduction catalyst for highly selective reduction of NO in excess oxygen, Applied Catalysis B: Environmental, 17 (1998), 259–266.

M. Koebel, M. Elsener, T. Marti, "$NO_x$–Reduction in Diesel Exhaust Gas with Urea and Selective Catalytic Reduction", Combustion Science and Technology, 1996, vol. 121, pp. 85–102.

\* cited by examiner

METHOD AND APPARATUS FOR EMISSION CONTROL

BACKGROUND OF THE INVENTION

1. Field of the Invention

The present invention relates to a method and apparatus for purifying exhaust gases from lean-burn engines, in particular for controlling the amount of $NO_x$ and soot after a diesel engine.

2. Brief Description of the Prior Art

Diesel engines are more efficient than gasoline engines and emit lesser amounts of greenhouse gas. However, their emissions contain large amounts of nitrogen oxides (hereunder sometimes abbreviated $NO_x$) and particulates (hereunder sometimes called soot). A diesel engine can be operated to emit less $NO_x$ or soot, but there is trade-off between the amount of soot and $NO_x$. For example, if the engine is operated to reduce the amount of soot in the exhaust gases, the amount of $NO_x$ increases.

Diesel engines operate under lean-burn conditions. As a result, the exhaust gas has a high concentration of oxygen so that conventional three-way catalyst and oxygen sensor technology used with stoichiometrically fueled gasoline engines cannot be used for treating diesel exhaust gases. A number of so called lean-$NO_x$ catalysts have been developed which are selective for $NO_x$ reduction with organic chemical reductants. These catalysts have a relatively narrow temperature window in which they are selective for $NO_x$ reduction; above which, the reductant is oxidized without effective $NO_x$ control. For high efficiency $NO_x$ reduction, in addition to having an effective temperature window, the catalysts also require that the reductant be present in a certain molar ratio to the $NO_x$.

The temperature of the exhaust gases from a diesel engine in transient operation, such as in a vehicle, varies from about 100 to 700° C. Until now, there has been no practical converter capable of $NO_x$ reduction over that range of normal operating conditions. Initially there is a problem in bringing a selected lean-$NO_x$ catalyst to a temperature within the temperature window that it is selective for $NO_x$ reduction and then there is problem in preventing it from being overheated. There is also a problem in providing the chemical reductant in the right proportion with respect to the $NO_x$.

Suitable reductants with lean-$NO_x$ catalysts are hydrocarbons, oxygenated organic compounds or carbon monoxide. Additional hydrocarbons or other reductant must be provided with lean-$NO_x$ catalysts as the amount of hydrocarbons in diesel exhaust is low.

Another $NO_x$ removal technology, which has been used for diesel exhaust aftertreatment, includes the selective catalytic reduction of $NO_x$ with a nitrogen containing compound such as urea or ammonia. Like the lean-$NO_x$ catalysts, the known catalysts for selective catalytic reduction of $NO_x$ (hereunder sometimes abbreviated SCR catalysts) provide for effective removal of $NO_x$ within some temperature window and with a sufficient amount of ammonia or other nitrogen containing reductant added to the exhaust gas. The temperature window for efficient operation of a SCR catalyst is typically wider than for a lean-$NO_x$ catalyst, yet there are no SCR catalytic systems that can provide for high $NO_x$ removal efficiency over the entire range of diesel exhaust temperatures.

A conventional catalytic converter for automotive exhaust aftertreatment includes a catalyst supported on a ceramic or metallic block or monolith with a plurality of straight, open channels for gas passage. In a conventional converter, the temperature inside the catalyst bed follows the temperature of the exhaust gases with some time delay. The temperature of the catalyst bed may then rise above the temperature of the exhaust gases since the reduction of $NO_x$ is an exothermic reaction. The exhaust gas parameters change quickly, with engine load and speed or during vehicle acceleration and deceleration, so that the temperature of the lean-$NO_x$ or SCR catalyst in the catalyst bed may fit the temperature window for $NO_x$ reduction for a while, but this favorable condition is not maintained long. Because the exhaust gases change in temperature with engine operating parameters, the catalyst quickly becomes overheated above the temperature window at which it is effective for $NO_x$ reduction, or overcooled below that window.

At low temperatures typical for low load mode of engine operation, the lean-$NO_x$ and SCR catalysts do not provide for appreciable $NO_x$ conversion. Hence at low temperatures, some of the hydrocarbons used as reductants over lean-$NO_x$ catalysts or the nitrogen containing compounds (e.g., ammonia or urea) used as reductants over SCR catalysts may be emitted with the exhaust gases, increasing the environmental hazard. At high temperatures, the hydrocarbon reductants over lean-$NO_x$ catalysts or nitrogen containing compounds over SCR catalysts quickly react with oxygen thus reducing the process selectivity for $NO_x$ reduction.

To some limited extent, the temperature of the exhaust gases can be controlled before or inside the converter. For example, a cooler can be installed in the exhaust pipe before the converter to control the temperature of the exhaust gases during engine acceleration. However, the cooler system is expensive, requires a suitable coolant and consumes energy. A heater system similarly adds to the cost and decreases engine efficiency.

Modern diesel vehicles are often supplied with catalytic or non-catalytic, filters capable of removing diesel exhaust particulates or soot. A popular commercial filter includes a ceramic monolith with a plurality of straight channels, opposite ends of which are opened or closed in checkerboard fashion. The particulates gradually accumulate on the filter walls. The filter can be regenerated by raising the temperature of the exhaust gases and burning the particulates off. The regeneration can be catalytically activated through the addition of metal oxides to the diesel fuel or by depositing an appropriate metal oxide catalyst on the filter ceramic substrate. For a non-catalytically activated filter, the typical temperature required for initial ignition of diesel particulates is in excess of 600° C. This temperature can be reduced to about 350–400° C. when the filter is catalytically activated. The temperature developed during the filter regeneration cannot be easily controlled as it depends on the amount of particulates accumulated. At high particulate capacity, the temperature can increase up to 1,200 to 1,400° C. during regeneration, which may cause the ceramic support to break down or the catalyst washcoat to be destroyed. Filter regeneration could be substantially improved if the operating temperature of the soot filter was above the soot ignition temperature most of the time so that filter regeneration occurred continuously. However, this is not easily achievable in a conventional converter, where the filter temperature follows that of the exhaust gases, and, therefore, can be very low for extended periods of time, allowing the soot to accumulate on the walls of the filter.

BRIEF SUMMARY OF THE INVENTION

In view of the above, it is an object of the present invention to provide a practical method and apparatus for purifying exhaust gases from a lean-burn engine, with a catalyst selective for $NO_x$ reduction. It is another object to provide such a method and apparatus that can accommodate wide variations in exhaust temperatures depending on the operating conditions of the engine. It is a still further object of the invention to provide for an improved method and apparatus for diesel soot removal that allows for continuous combustion of accumulated soot even when the temperature of the exhaust gases is low. Other objects and features of the invention will be in part apparent and in part pointed out hereinafter.

The present invention provides a converter containing a catalyst bed with a catalyst which is effective for $NO_x$ reduction. The invention also concerns a method for periodically reversing the flow of exhaust gases from a lean-burn engine through the converter to maintain the catalyst in a temperature window that is selective for the reduction of $NO_x$ with a chemical reductant. Said method also includes the addition of chemical reductant to the exhaust gases as they are reverse flowed through the converter such that the chemical reductant is present in the amount required for the catalyst to be efficient in $NO_x$ reduction.

The invention further provides a soot trap which may be in series with the catalyst bed in the converter discussed above, or provided as a portion of the converter. The method includes the addition of a chemical reductant to the exhaust gases as they are reverse flowed through the converter for use in heating and then continuously maintaining the soot trap at or above the ignition temperature of the soot.

The invention summarized above comprises the method and constructions hereinafter described, the scope of the invention being indicated by the subjoined claims.

BRIEF DESCRIPTION OF THE SEVERAL VIEWS OF THE DRAWING

In the accompanying drawings, in which several of various possible embodiments of the invention are illustrated, corresponding reference characters refer to corresponding parts throughout the several views of the drawings in which.

DETAILED DESCRIPTION OF THE INVENTION

Figure 1:
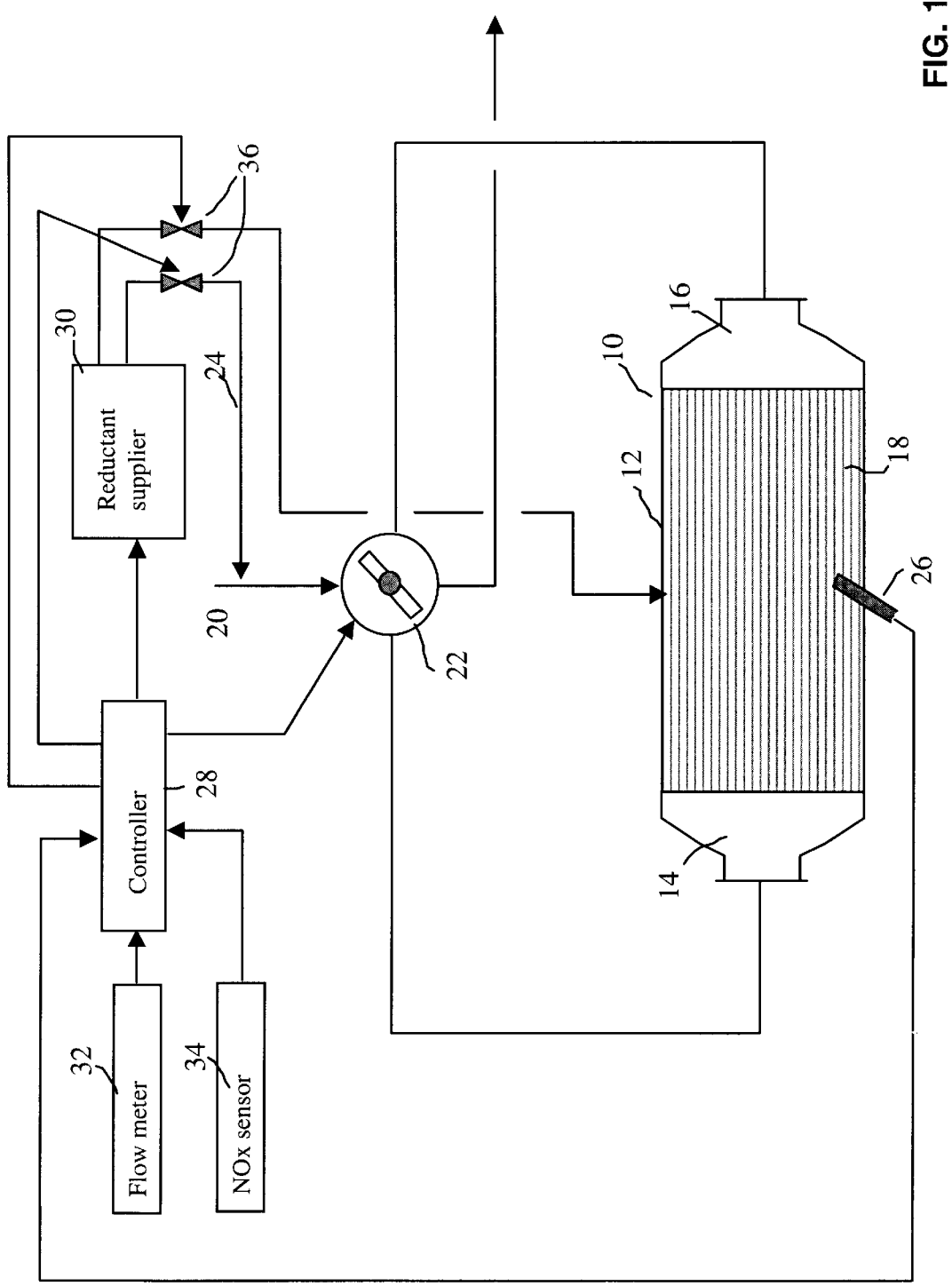
FIG. 1 is a schematic diagram of a general embodiment of an apparatus for purifying exhaust gases from a lean-burn engine in accordance with the present invention. The diagram illustrates a converter packed with a lean-$NO_x$ catalyst, SCR catalyst or the like on a catalyst bed such as a monolith wherein the flow of the exhaust gases through the converter is reversed while a chemical reductant (e.g., hydrocarbons, oxygenated organic compounds or carbon monoxide with lean-$NO_x$ catalysts or nitrogen containing compounds such as urea and ammonia with SCR catalysts) is added in an amount sufficient to reduce the $NO_x$ to $N_2$ by a desired amount and to heat and maintain the catalyst so that it is within a temperature window wherein the catalyst is effective for $NO_x$ reduction.

In accordance with the present invention, a converter 10 is provided for controlling the amount of $NO_x$ in exhaust gases from a lean-burn engine. Converter is particularly designed for use with a lean-burn engine under transient operation such as a diesel engine in a vehicle but can include stationary engines.

The major pollutants in exhaust gases from a diesel engine are $NO_x$ and soot. The exhaust gases, however, also include hydrocarbons (hereunder sometimes abbreviated HC), carbon monoxide, water vapor, possibly some $SO_2$ and a high concentration of oxygen.

Converter 10 is a substantially closed container 12 with an inlet 14 and an outlet 16 between which is packed a catalyst bed 18 comprising catalyst capable of reducing $NO_x$ to $N_2$ in a gas permeable solid material. The gas permeable solid material can be any material used as a catalyst substrate in an automobile exhaust purifier. For example, the gas permeable solid material can be formed from alumina, mullite, cordierite, zirconia or mixture thereof or from some other ceramic material that possesses high thermal stability and is resistant to thermal shock.

Converter 10 can be thermally insulated using state-of-the-art means and gas permeable solid material may be provided as a randomly packed material of any suitable shape such as spheres, cylinders, Rashig rings, etc. or as a monolith having a random structure such as a ceramic, metallic, etc. porous foam, or an ordered structure with corrugated or wave channels, etc. It is preferred that the gas permeable solid material be formed as a monolith with straight, parallel channels to facilitate passage of the exhaust gases. The channels can have different sizes along the length of the monolith, but it is preferred that the channels be essentially equal in size.

A suitable catalyst for use in converter 10 must have a temperature window within which it is effective for $NO_x$ reduction with a chemical reductant. For use in the present invention, the catalyst must be at least partly effective at destroying or oxidizing harmful compounds in the exhaust gases with the added chemical reductant and/or with CO and hydrocarbons present in the exhaust gases to non-harmful compounds such as carbon dioxide, water and nitrogen. The catalyst should be effective for $NO_x$ reduction in the presence of water, $SO_2$, and such other materials as may be found in the exhaust gases. Suitable lean-$NO_x$ catalysts presently available and prospective lean-$NO_x$ catalysts include low temperature noble metal catalysts such as $Pt/Al_2O_3$, $Pt/SiO_2$ or Pt on ion-exchanged zeolite. These catalysts provide for $NO_x$ reduction within a temperature window between 200 and 250–300° C. Many zeolite based catalysts, such as those obtained through incorporation of transition metals (for example Fe, Cu and Co) to ZSM-5 or zeolite-Y structure can be effective within a temperature window from 300 to 500° C. Some alumina supported catalysts such as, for example, $AgAlO_2/Al_2O_3$, $Sn/\gamma\text{-}Al_2O_3$ can be applied in a higher temperature window, i.e., between 400 and 600° C. Highly acidic alumina is, itself, active for $NO_x$ reduction by hydrocarbons in a temperature window between 550 and 650° C.

For urea or ammonia based $NO_x$ reduction systems, common SCR metal oxide catalysts include $TiO_2$—$WO_3$—$V_2O_5$. Such catalysts typically provide for $NO_x$ reduction in a temperature window between about 250 and about 450–500 C. At lower temperatures, the rate of $NO_x$ reduction is low, thus the $NO_x$ passes through the converter unaffected, while the nitrogen containing compounds, such as ammonia, add to the pollutants in the exhaust gases.

As described below, converter 10 may have more than one catalyst bed 18. It will be understood that when more than one catalyst is used, the catalysts may be mixed and distributed in the gas permeable solid material. Alternatively, the catalysts may be provided in separate catalyst beds for sequential passing of the exhaust gases.

When the catalyst is a lean-$NO_x$ catalyst, the chemical reductant may be selected from linear, cyclic and aromatic hydrocarbons, oxygenated organic compounds such as aldehydes, alcohols and ketones, or carbon monoxide, provided the selection is operative to reduce the $NO_x$ in the temperature window of the lean-$NO_x$ catalyst selected for catalyst bed 18. Mixtures of hydrocarbons, such as found in diesel fuel, may be used and, for reasons of cost, may be preferred. When the catalyst is a SCR metal oxide catalyst, the chemical reductant is a nitrogen containing compound such as ammonia or urea.

When the catalyst is a lean-$NO_x$ catalyst and the chemical reductant is a hydrocarbon fuel, the hydrocarbon reductant can be preliminarily pre-treated in a partial oxidation reactor to obtain mixtures of oxygenated organic compounds such as aldehydes, alcohols and ketones, which may be more effective at $NO_x$ reduction than the hydrocarbons. Alternatively, oxygenated organic compounds such as acetaldehyde, formaldehyde, methanol, ethanol, acetone or the like can be specially supplied and carried onboard the vehicle for admixture with the diesel exhaust gases.

Within the temperature window of the lean-$NO_x$ catalyst, the chemical reductant (taken as HC) either reduces the $NO_x$ or is oxidized by the oxygen. The chemistry of $NO_x$ reduction is represented by the following generalized process:

$$NO_x + HC \rightarrow CO_2 + H_2O + N_2 \quad \text{(Process 1)}.$$

The competing process is the reaction of the organic compound with oxygen:

$$O_2 + HC \rightarrow H_2O + CO_2 \quad \text{(Process 2)}.$$

The ratio between the rate of Process 1 and the rate at which the HC is consumed through combined Processes 1 and 2 determines the catalyst's selectivity for $NO_x$ reduction.

With the lean-$NO_x$ catalysts mentioned above, selectivity of the catalyst for $NO_x$ reduction within the temperature window requires that the reductant be in molar excess to the $NO_x$. Preferably, the molar ratio of the reductant taken as $C_1$ is equal to or greater than 2:1, more preferably between about 2:1 and 8:1; however, the chemical reductant may be in even greater excess so long as the HC emissions after the converter are within acceptable levels.

Within the temperature window for the SCR catalysts, the reductant is typically ammonia. If urea is used as the reductant, the urea is initially decomposed to ammonia before the $NO_x$ reduction begins. At optimal operating temperature, the reduction of the NO and $NO_2$ components of $NO_x$ can be described by the following generalized process:

$$NO + NO_2 + NH_3 + O_2 \rightarrow N_2 + H_2O \quad \text{(Process 3)}$$

At excessively high temperature, the ammonia is oxidized to $N_2$, NO or $N_2O$, thus decreasing the selectivity:

$$NH_3 + O_2 \rightarrow N_2, NO, N_2O + H_2O \quad \text{(Process 4)}$$

For SCR catalysts, substantial reduction of $NO_x$ can be obtained when the molar ratio of the reductant taken as N to $NO_x$ is higher than about 0.5:1, preferably between about 0.5 and 0.8 to 1. At ratios higher than 1:1, a substantial quantity of unreacted ammonia, urea or other nitrogen containing compound may pass through the converter even when the catalyst is within the temperature window for selective reduction of the $NO_x$. When the molar ratio is below about 0.5:1, less of the $NO_x$ is reduced.

Converter 10 is inserted into an exhaust line 20 with a switching valve 22 for reversing the flow of the exhaust gases between inlet 14 and outlet 16. One or more ports 24 may be provided for adding reductant to the exhaust gases. Ports 24 may be upstream of converter 10, in converter 10, or both.

The initial stage of the method according with the present invention includes heating up catalyst bed 18 so that at least a fraction of the bed reaches a temperature in the temperature window at which the catalyst is effective with regards to $NO_x$ reduction. As hot exhaust gases from the engine pass through converter 10, the temperature of the bed will follow the temperature of the exhaust gases with a time delay. This process can be accelerated with an electric heater or burner provided upstream of converter 10 for boosting the temperature of the exhaust gases or with an electric heater or burner provided in converter 10 or catalyst bed 18 for heating the catalyst bed directly.

If the temperature in catalyst bed 18 exceeds the temperature window of the lean-$NO_x$ or SCR catalyst, the initial stage of the method according with the present invention involves cooling down the bed by decreasing the temperature of the exhaust gases either through deceleration (or load decrease) of the engine, or through the use of a cooler installed before or inside converter 10.

One or more temperature sensors 26 should be provided inside converter 10 for monitoring the temperature in catalyst bed 18. The temperature information from sensors 26 is provided to a controller 28. When the temperature in at least a portion of catalyst bed 18 reaches a temperature in the temperature window at which the catalyst is effective with respect to $NO_x$ reduction, controller 28 activates both switching valve 22 and a reductant delivery system 30.

When sensors 26 determine that the temperature inside catalyst bed 18 has reached the temperature window of the lean-$NO_x$ or SCR catalyst, reductant delivery system 30 adds reductant to the exhaust gases through ports 24. Ports 24 may be in exhaust line 20, in converter 10 or in catalyst bed 18. More particularly, the addition of reductant can be made in exhaust line 20 before converter 10 or directly into the converter or both before and inside the converter. Alternatively, when the catalyst is a lean-$NO_x$ catalyst and the reductant is a hydrocarbon, the reductant can be added directly in the cylinders of the diesel engine. In-cylinder addition is preferably performed by means of recurring injection pulses of reductant during each cycle of piston movement. The timing of reductant injection can be a function of the crank angle after top dead center of the piston. For example, this crank angle can be chosen between 45 and 120°.

Reductant delivery system 30 may include an injection pump or compressed air injector. Delivery system 30 can also include a partial oxidation reactor for converting hydrocarbon reductant to oxygenated organic compounds (i.e. aldehydes, alcohols, ketones and so on), which may be more effective with regard to $NO_x$ reduction over a particular lean-$NO_x$ catalyst. The partial oxidation reactor may be installed in reductant delivery system 30 and can include a specific catalyst for partial oxidation of hydrocarbons, selected for example from the group consisting of oxides of base metals supported on alumina.

When the temperature inside catalyst bed 18 reaches a temperature within the catalyst temperature window for effective $NO_x$ reduction, as delivery system 30 adds reductant to the exhaust gases, controller 28 causes switching valve 22 to begin to periodically reverse the flow of the exhaust gases between inlet 14 and outlet 16. By continuing to periodically reverse the flow of exhaust gases through catalyst bed 18, the required temperature of the catalyst operation is sustained for a longer time than with a conventional non-flow-reversing operation. This allows for maintaining catalyst bed 18 at a temperature within the temperature window for the lean-$NO_x$ or SCR catalyst as the exhaust gases vary in temperature with changing engine operating parameters of speed and load.

The amount of reductant added to the exhaust gases should be commensurate with the amount of $NO_x$ treated. For lean-$NO_x$ catalysts, the reductant must be taken in molar excess to the $NO_x$, such that the number of carbon atoms supplied by the reductant combined with unburned hydrocarbons in the exhaust gases is greater than the number of $NO_x$ molecules. The preferred ratio of moles of reductant taken as $C_1$ to the number of moles of $NO_x$ should be greater than one and preferably between 2 and 8. For the SCR process, the molar ratio of reductant and $NO_x$ taken as a ratio of number of nitrogen atoms should be less than one, preferably between 0.8 and 1.0. The molar ratio between the reductant and $NO_x$ can be controlled using a flow meter 32. Information from flow meter 32 is supplied to controller 28 which signals the amount of reductant to be added by reductant delivery system 30. The exhaust gas flow rate can be measured directly or computed based on the operating parameters of the engine such as its rotating speed, acceleration and deceleration, pressure in the intake pipe and so on. The means for controlling reductant delivery system 30 can also include a $NO_x$ sensor 34. This sensor can directly measure the $NO_x$ concentration in the exhaust gas. It is preferred, however, that the $NO_x$ concentration be predictively computed based on the operating parameters of the engine (e.g. its rotating speed, acceleration and deceleration, torque, pressure in the intake pipe, the opening of the injection pump and so on). The amount of $NO_x$ can be further calculated as a product of measured or predicted $NO_x$ concentration and total exhaust gas flow rate determined with help of flow meter 32.

Controller 28 is programmed to calculate the amount of reductant necessary for efficient $NO_x$ reduction based on the flow rate and $NO_x$ concentration of the exhaust gases, and temperature inside catalyst bed 18, obtained with flow meter 32, $NO_x$ sensor 34 and temperature sensor 26. One of the simplest methods of control, which can be used for the system including lean-$NO_x$ catalyst, includes a proportional adjustment of the amount of added reductant to the total flow rate of exhaust gas. In this case, the concentration of the reductant will be approximately constant at all conditions of engine operation and the method does not require $NO_x$ sensor 34. An alternative method, which can be used with converters having a lean-$NO_x$ catalyst as well as those with a SCR catalyst, includes control of the amount of reductant proportionally to $NO_x$ flow rate, which may be determined with the help of $NO_x$ sensor 34 and flow meter 32.

If the temperature in catalyst bed 18 exceeds the predetermined catalyst temperature window, controller 28 may be programmed to signal reductant delivery system 30 to reduce amount of reductant added to the exhaust gases. Lowering the amount of reductant, decreases the energy released due to the exothermic oxidation of the reductant and, thus, causing the temperature in converter 10 to fall until it is within the temperature window at which the catalyst is effective with regards to $NO_x$ reduction. In another situation, when the temperature measured by temperature sensor 26 is below the predetermined catalyst temperature window, controller 28 may be programmed to increase the amount of reductant thus causing the temperature of catalyst bed 18 to rise because of the exothermic oxidation of the reductant, tending to restore the temperature of the bed to a temperature within the catalyst temperature window. The appropriate amount of the reductant can be selectively injected through different ports 24 using control valves 36. For example, delivery of the reductant can be completely cut off from converter inlet 14 and outlet 16 if the temperature in the boundaries of converter 10 near inlet 14 and outlet 16 exceeds the range of the catalyst temperature window, while continuing the addition of reductant through ports 24 inside converter 10 if the temperature there remains within the temperature window.

A soot trap 38 may be included in converter 10, placed in series with the converter or used alone as more particularly described below. Soot trap 38 filters soot from the exhaust gases by physically trapping the particles in their structure. Soot trap 38 may comprise a packing such as a temperature resistant metal or mineral wool. Of particular interest, however, are the ceramic monoliths traversed by parallel flow passages in which at any one time a passage, which is open on an end face, is closed on the other end face so that macroporously designed passage walls act as filter surfaces.

From time to time the accumulated soot in soot trap 38 must be oxidized to regenerate the soot trap and prevent unacceptable levels of exhaust back pressure on the engine. The most common regeneration methods employ thermal means (engine operation modifications mainly by throttling intake or exhaust flow and/or addition of auxiliary heat via burners, electric heaters, etc.), aerodynamic means, or catalytic means (catalytic fuel additives, catalytic coatings, exhaust catalyst/oxidant injection, etc.). Catalytic fuel additives such as ceria and copper oxide reduce the ignition temperature to about 350 to 550° C. in a so-called passive soot trap. The engine can then be adjusted to operate at higher soot emissions and lower $NO_x$; however, this technology requires the cooperation of the petroleum industry for the addition of ceria and copper oxide to the fuel and increases fuel costs. The metal oxides in the fuel may also corrode the engine and exhaust system and be harmful to the environment. In addition, the emission of $NO_x$ is still high.

Soot trap 38, like catalyst bed 18, can be brought to the ignition temperature of the soot by the addition of reductant or by an external thermal source. Reverse flowing of the exhaust gases through soot trap 38 assists in heating the trap and maintaining it at the ignition temperature of the soot.

Various embodiments of the present invention are described below with specific reference to the accompanying drawings.

First Embodiment

As shown in FIG. 1, a gas permeable solid material, such as a monolith, is provided in converter 10 between inlet 14 and outlet 16. Catalyst bed 18 comprises a catalyst with a temperature window in which it is effective at reducing $NO_x$ with a reductant. The catalyst is deposited on the monolith. Switching valve 22 reverses the flow of the exhaust gases from a lean-burn engine through converter 10 between inlet 14 and outlet 16. A reductant, such as diesel fuel when the catalyst is a lean-$NO_x$ catalyst, may be added to the exhaust gases through port 24 upstream of converter 10 or through port 24 into catalyst bed 18.

In operation, catalyst bed 18 may be heated with an external source until a portion of the catalyst reaches a temperature at which the catalyst is effective for $NO_x$ reduction with the reductant. Thereafter, the exhaust gases are reverse flowed through converter 10 in a continuous series of cycles while additional reductant is added through port(s) 24 in an amount sufficient to reduce the $NO_x$ and to maintain a portion of the catalyst in catalyst bed 18 at a temperature within the temperature window.

Second Embodiment

Figure 2:
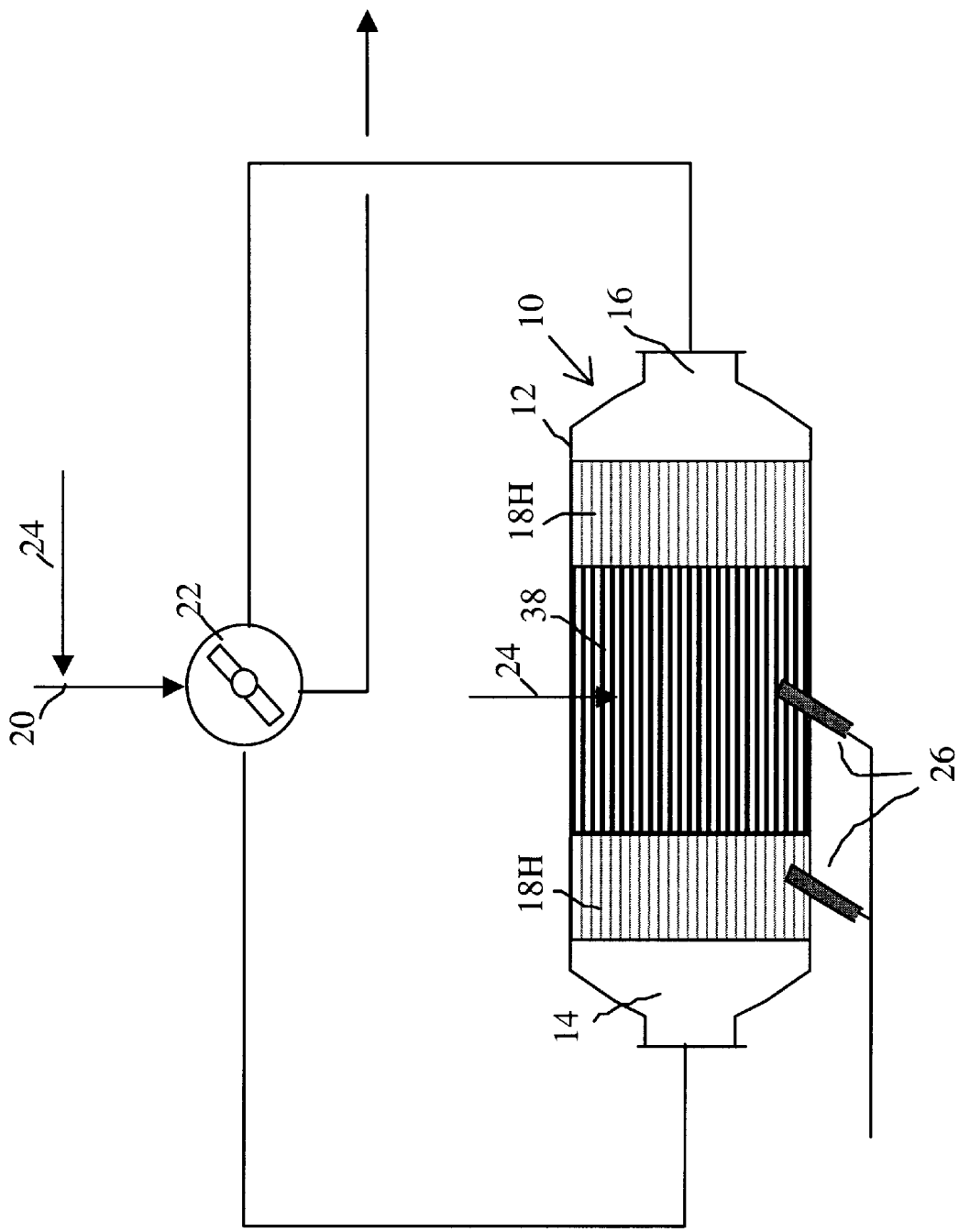
FIG. 2 is a schematic view of a modified second embodiment wherein the converter includes a soot trap flanked by high temperature lean-$NO_x$ catalyst monoliths.

A preferred embodiment of the present invention is shown in FIG. 2 wherein a soot trap 38 is placed between two beds of a high-temperature lean-$NO_x$ catalyst 18H. The system of operation includes injection of a hydrocarbon reductant or the like at port 24 upstream of converter 10. Ideally, the reductant is diesel fuel. After initially warming up beds 18H with an external thermal source, the system can maintain optimal catalyst temperature for a long time. The exhaust gases containing $NO_x$ and hydrocarbon react with the catalyst surface to produce primarily $N_2$. Soot trap 38 will be regenerated continuously or periodically depending on the temperature requirements for oxidizing the soot. A periodic temperature increase for filter regeneration will be created naturally from the temperature excursion of the exhaust gases at high engine torque, or it will be forced by an increase in the amount of hydrocarbon reductant added to the exhaust gases. Catalyst bed 18H downstream of soot trap 38 will promote oxidation of excess hydrocarbons by oxygen. To avoid sulfate build-up and formation of insoluble particulates, the diesel fuel should preferably have reduced sulfur content. With sulfur-free fuel (synthetic diesel, for instance), converter 10 may reduce $NO_x$ and soot emissions to nearly zero. A conventional, non-flow reversal converter would be impractical because of its inability to retain heat at low exhaust temperatures.

Third Embodiment

Figure 3:
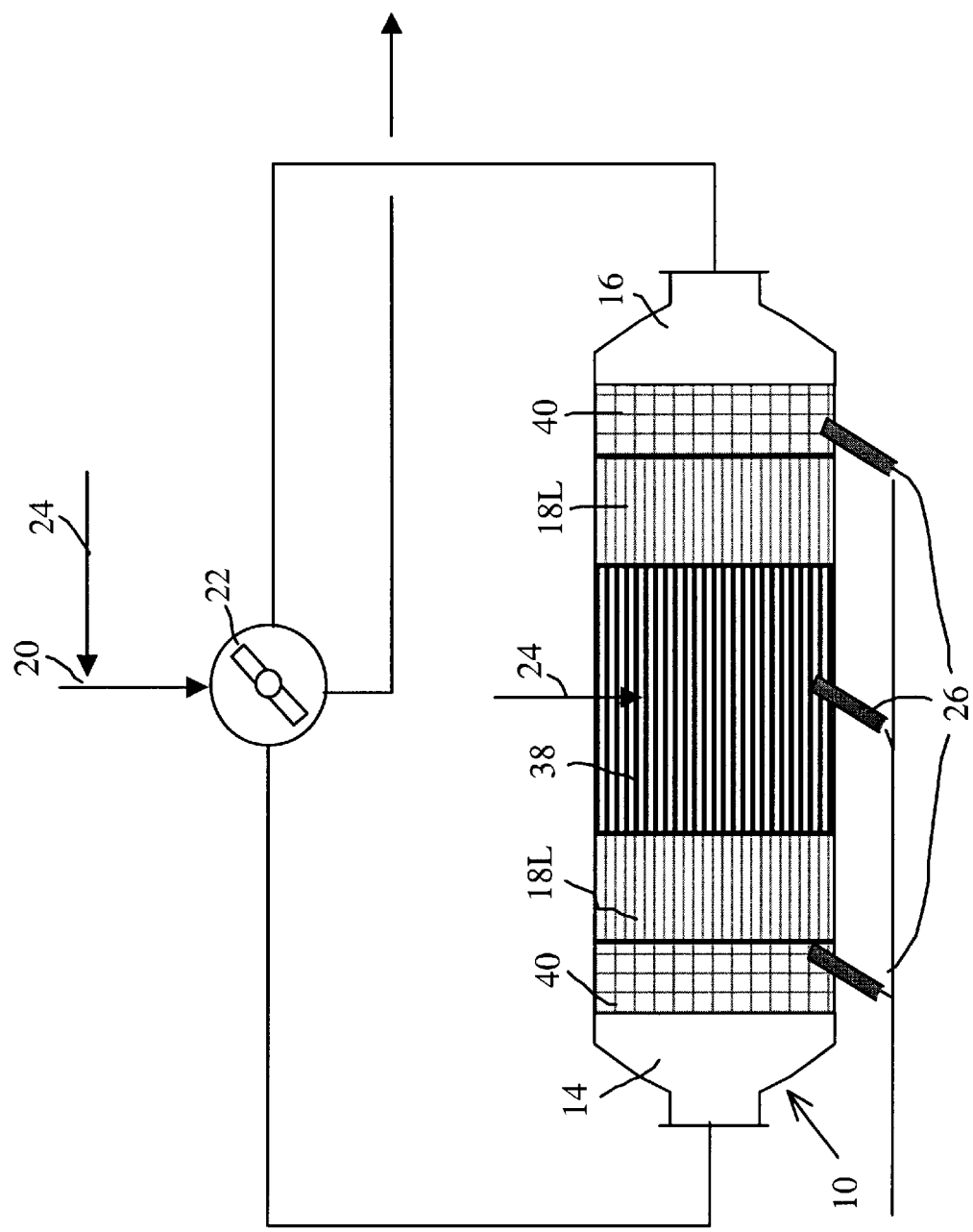
FIG. 3 is a schematic view of a third embodiment wherein low temperature, noble metal lean-$NO_x$ catalyst beds are inserted between a soot trap and beds of catalytically inert material.

In the embodiment shown in FIG. 3, converter 10 includes a soot trap 38 flanked by low temperature noble metal lean-$NO_x$ catalyst beds 18L. Boundary beds of gas permeable solid material 40 flank catalyst beds 18L. Gas permeable solid material 40 is not catalytically active and serves as a heat exchanger. This arrangement may be preferred for treatment of exhaust gases from light duty diesel engines characterized by low soot emission. The boundary inert beds 40 prevent catalyst beds 18L from being overheated and thereby maintain the catalyst temperature within the temperature window where the catalyst is selective for $NO_x$ reduction during temperature excursions of the exhaust gases from vehicle acceleration.

Fourth Embodiment

Figure 4:
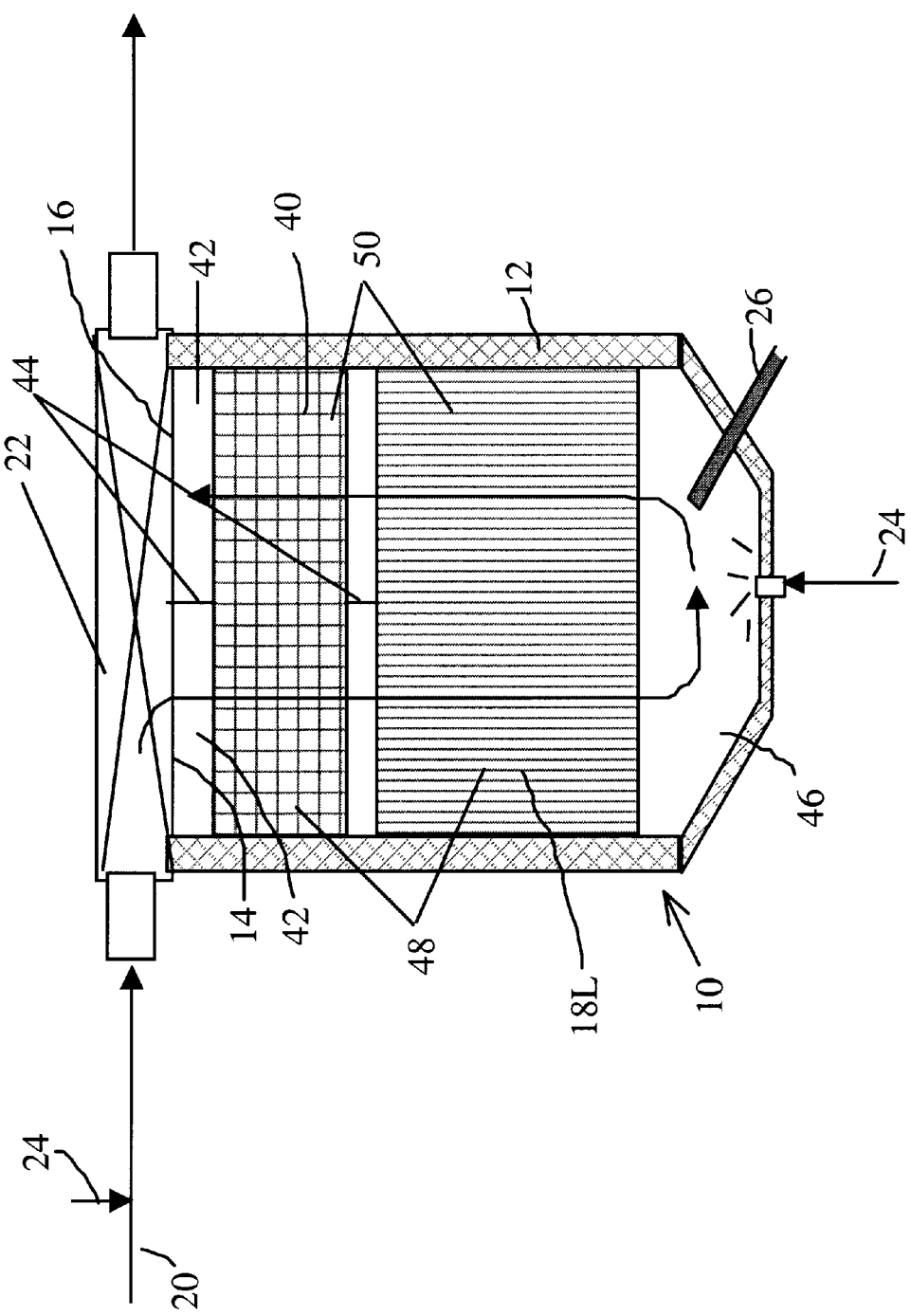
FIG. 4 is a schematic view of a fourth embodiment wherein the converter includes a brick of low temperature lean-$NO_x$ catalyst and a brick of a catalytically inert monolith, capable of serving as a heat reservoir.

FIG. 4 shows a fourth possible configuration for converter 10. Converter 10 includes two packed beds 40 and 18L of an gas permeable material arranged as cylindrical monoliths with straight-through channels. Upper bed 40 is not catalytically active and serves as a heat exchanger. Lower monolith 18L has a noble metal lean-$NO_x$ catalyst deposited over its internal surface and thereby provides for $NO_x$ reduction with a hydrocarbon reductant. According to this arrangement, converter container 12 is divided into two plenums 42 by separation plates 44. The plenums are connected with a U-bend passage 46 at the bottom of container 12. The exhaust gases alternatively pass in one direction through one-half 48 of monoliths 40 and 18L and in an opposite direction through the other half 50 of monoliths 40 and 18L. The structure of monolith channels together with separating plates 44 prevent gas leakage between halves 48, 50. The hydrocarbon reductant is introduced through port 24 in inlet 14 of converter 10 and through port 24 in U-bend passage 46 and port 24 in separation plates 44. Switching valve 22 is installed above container 12 and provides for periodic flow reversal of the exhaust gases between plenums 42 and halves 48, 50 of monoliths. Switching valve 22 may have an intermittent drive such as described in SAE paper 99FL-288 "Development of a compact reverse-flow catalytic converter for diesel dual fuel LEV" by M. Zheng, E. Mirosh, W. Klopp, D. Ulan, M. Pardell, P. Newman, Yu. Matros and G. Bunimovich. Alternative designs for switching valve 22 include means for continuously rotating the valve and separation plates 44. Other possible configurations may include continuous rotating of catalyst bed 18L and inert monolith 40 with regards to fixed inlet 14 and outlet 16 as described in U.S. Pat. No. 5,768,888 to Matros et al.

Fifth Embodiment

Figure 5:
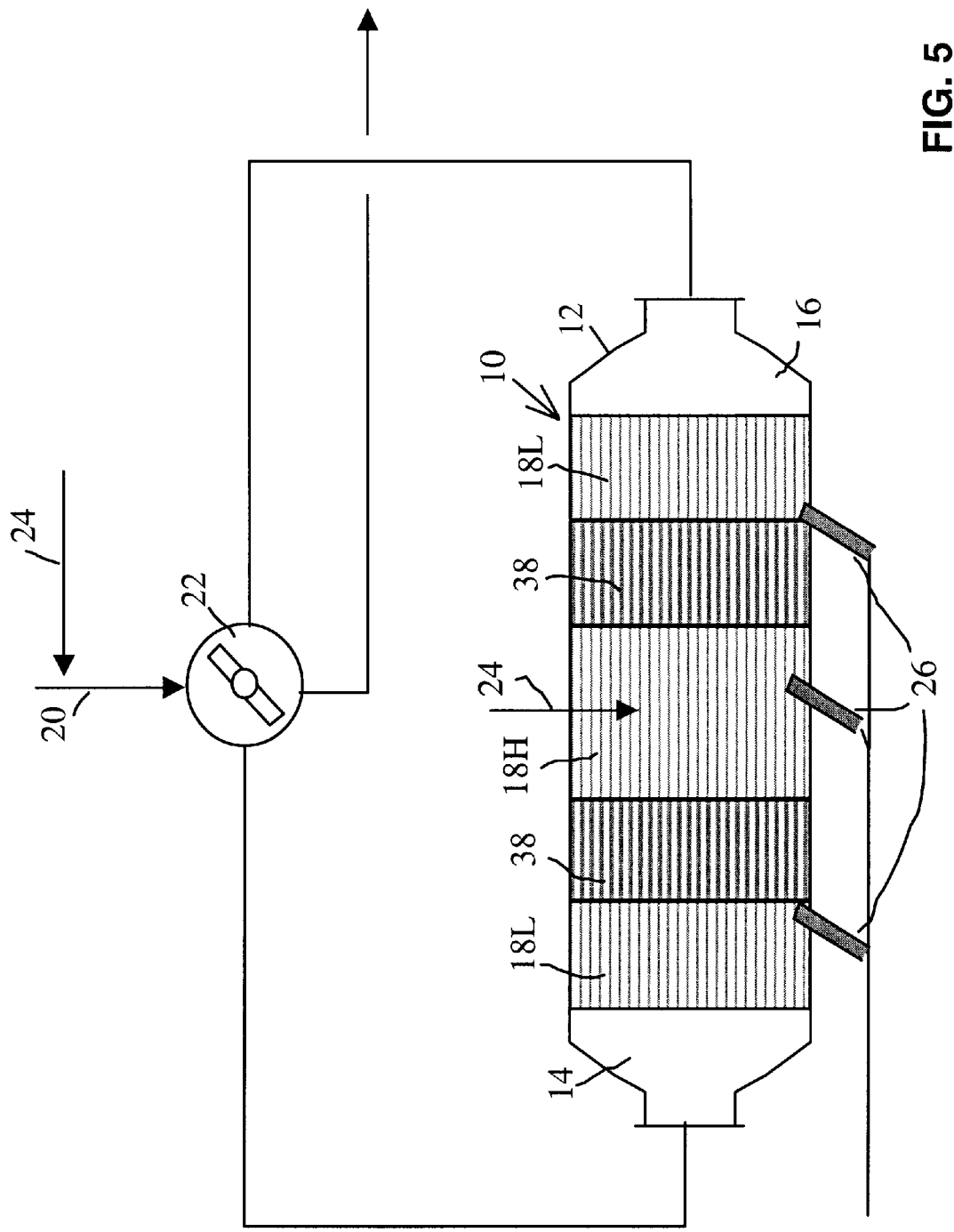
FIG. 5 is a schematic view of a fifth embodiment with a bed of high temperature lean-$NO_x$ catalyst beds flanked by soot traps and boundary beds of catalytically inert material.

The fifth embodiment of the present invention may be useful for purifying exhaust gases from a diesel engine operated on a low-sulfur diesel fuel having a sulfur concentration less than 50 ppm. In this embodiment as shown in FIG. 5, soot trap 38 is inserted between noble metal, low temperature lean-$NO_x$ catalyst bed 18L and base metal, high temperature lean-$NO_x$ catalyst bed 18H. The noble metal, low temperature lean $NO_x$ catalyst monolith bed 18L allows for quick ignition of the converter, while the high temperature lean-$NO_x$ catalyst bed 18H takes over $NO_x$ reduction when the temperature in the low temperature lean-$NO_x$ bed 18L exceeds the temperature window for the noble metal catalyst. After the high temperature lean-$NO_x$ catalyst has reached the temperature window at which it is effective for $NO_x$ reduction, the reductant is mainly injected into the high temperature catalyst bed 18H. At this time, the temperature in soot trap 38 rises sufficiently for continuous combustion of accumulated soot particles. The process of continuous soot regeneration is enhanced by $NO_2$ produced through NO oxidation over the noble metal catalyst bed 18L. The noble metal catalyst oxidizes NO in exhaust gas to $NO_2$ which catalyses the process of soot removal in the soot trap. The hydrocarbons that were not oxidized over the base metal, high temperature lean-$NO_x$ catalyst bed 18H are effectively removed as they pass through noble metal catalyst 18L located in outlet 16 of converter 10.

Sixth Embodiment

Figure 6:
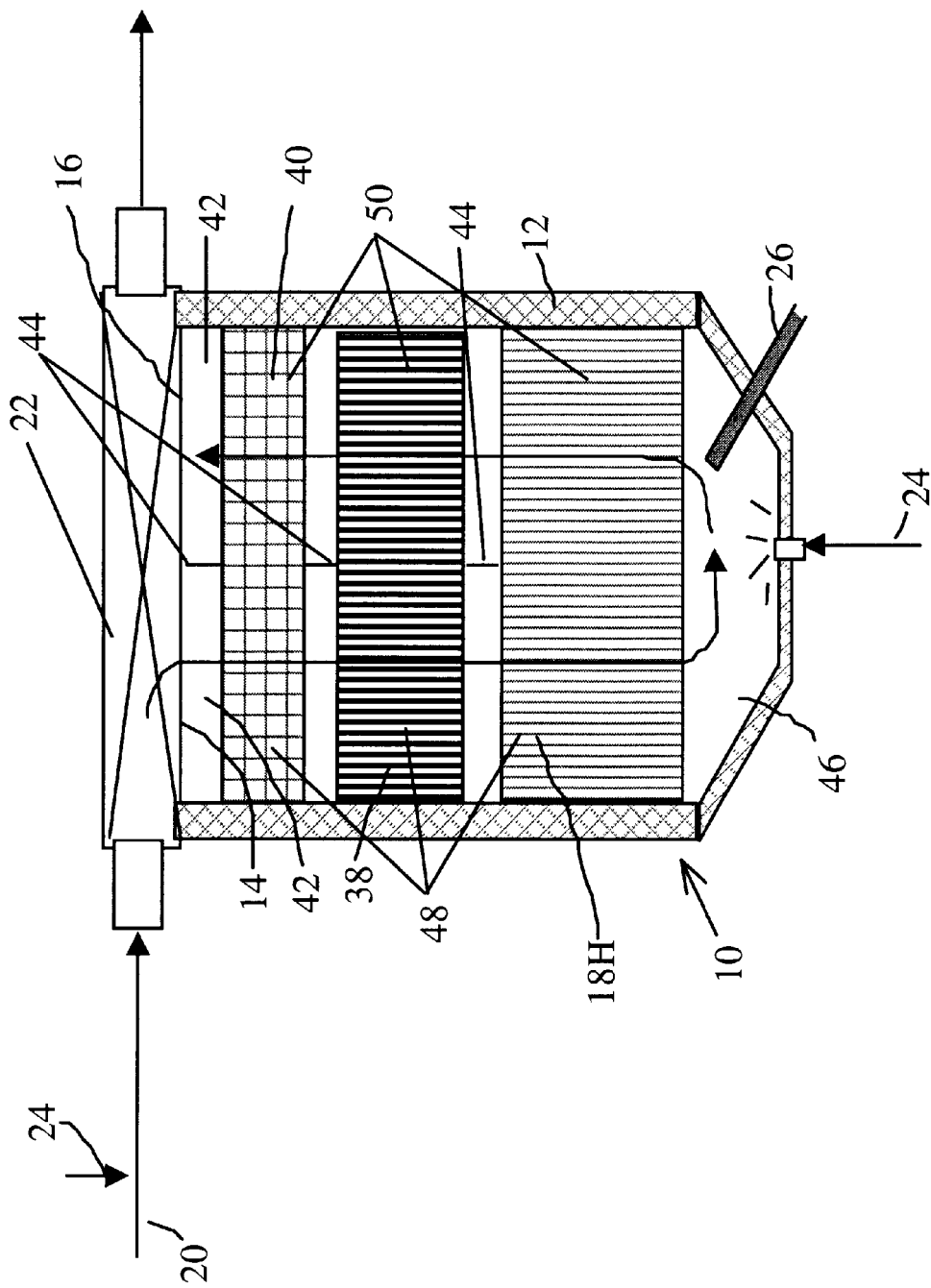
FIG. 6 is a schematic view of a converter designed in accordance with the fifth embodiment described above.

FIG. 6 shows a possible configuration of converter 10 operated in accordance with the fifth embodiment. This configuration is similar to that shown in FIG. 4 except that it includes soot trap 38 and high temperature catalyst monolith 18H. Reductant (e.g., hydrocarbon) injection is provided through port 24 into converter inlet 14 and through port 24 into the middle of u-bend passage 46.

EXAMPLE 1

A converter as shown in FIG. 1 may be used for purification of exhaust gases released after a medium size heavy-duty truck with a naturally aspirated ISUZU engine having a displacement volume 8.2 L. The engine may be installed on a dynamometer and tested using a standard 13 mode Japanese procedure for heavy-duty diesel engines. Table 1 describes the engine parameters and characteristics of the exhaust gases during each mode of the test.

TABLE 1

Engine and exhaust gas parameters for 13 mode Japanese test:

| Test mode | Mode duration (sec) | Engine speed (rpm) | Engine torque (Nm) | Engine power (KW) | Exhaust flow rate (g/s) | Exhaust temperature (° C.) | NOx concentration (ppm) | HC concentration (ppm) |
|---|---|---|---|---|---|---|---|---|
| 1 | 306 | 560 | 5 | 0.3 | 40 | 150 | 160 | 210 |
| 2 | 124 | 1120 | 103 | 12.1 | 76 | 200 | 200 | 110 |
| 3 | 102 | 1120 | 206 | 24.2 | 76 | 250 | 300 | 95 |
| 4 | 316 | 560 | 4 | 0.2 | 39 | 110 | 150 | 180 |
| 5 | 115 | 1680 | 105 | 18.5 | 110 | 212 | 195 | 120 |
| 6 | 147 | 1680 | 206 | 36.2 | 108 | 330 | 250 | 115 |
| 7 | 119 | 2240 | 208 | 48.8 | 138 | 420 | 220 | 135 |
| 8 | 109 | 2240 | 312 | 73.2 | 132 | 550 | 230 | 180 |
| 9 | 162 | 1680 | 316 | 55.6 | 97 | 530 | 340 | 200 |
| 10 | 136 | 1680 | 422 | 74.2 | 108 | 550 | 340 | 110 |
| 11 | 129 | 1680 | 501 | 88.1 | 134 | 600 | 660 | 100 |
| 12 | 115 | 2240 | 417 | 97.8 | 180 | 650 | 520 | 115 |
| 13 | 240 | 1680 | 26 | 4.6 | 104 | 200 | 160 | 135 |

As shown in Table 1, the total duration of the test is 2120 sec. In modes 1–6 and 13, which take up of about 60% of total test time, the engine is operated at relatively low speed and torque so that the temperature of the exhaust gases is below 400° C. In highly loaded modes of operation 7-12, the exhaust gases rise to 650° C. The standard procedure includes initial warming up the engine in highly loaded mode such that the converter is preheated to 450° C. or higher before the test begins. The concentration of $NO_x$ in diesel exhaust gases varies from 160 to 660 ppm depending on engine operating conditions while the concentration of hydrocarbons does not exceed 200 ppm during all modes of operation (Table 1).

Converter 10 installed after the engine operates according to the general embodiment shown in FIG. 1 and has the particular configuration shown in FIG. 3 except that only one catalytically active cylindrical monolith is included. The monolith is 14 inches (355.6 mm) in diameter and 10 inches (254 mm) in length. It is made from a standard metallic substrate formed from two sheets of metal foil, 0.5 mm thick, and rolled together into a spiral shape. One of the sheets is flat and the other is corrugated. The straight-through channels formed between the corrugated and flat foil sheets are approximately 1.5 mm in size. The cell density of the channels, in a cross-section of the block, is about 200 cells per square inch (200 cpsi) and the total volume of block is about 25 L.

Figure 7:
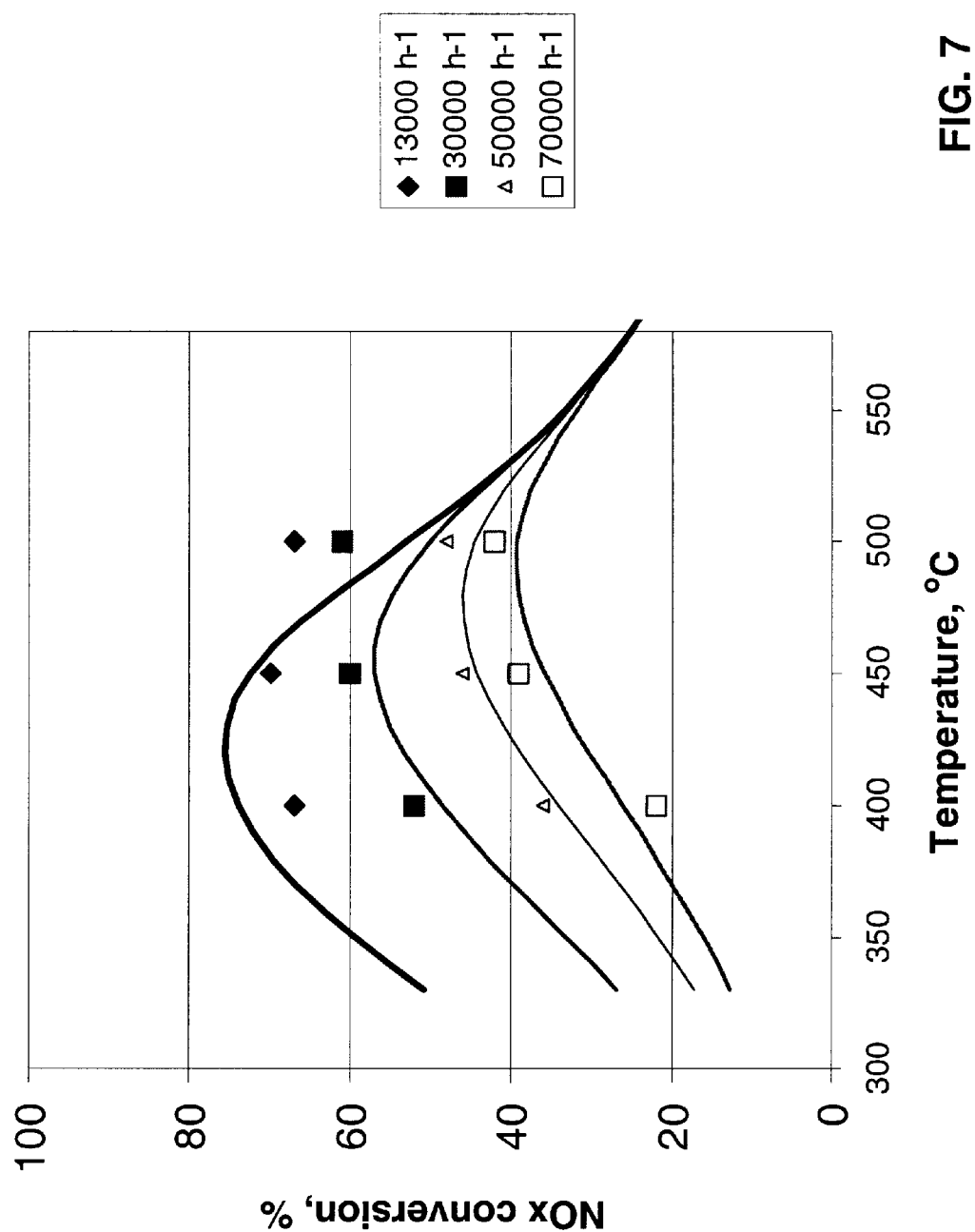
FIG. 7 shows predicted curves for $NO_x$ reduction versus temperature at different space velocities with a representative base metal lean-$NO_x$ catalyst; and, FIG. 8 shows predicted temperature, $NO_x$ concentration and $NO_x$ emission diagrams after a diesel engine during Japanese 13 mode standard procedure testing for a heavy-duty engine.

A washcoat of a base metal, high temperature lean-$NO_x$ catalyst is applied to the block. The catalyst used in this example is a tungsten/silver aluminate catalyst, W/AgAlO$_2$/Al$_2$O$_3$, prepared according to the method described in a publication by Nakatsuji et al. (T. Nakatsuji, R. Yasukawa, K. Tabata, K. Ueda, M. Niwa, "Catalytic reduction of $NO_x$ in exhaust gas from diesel engines with secondary fuel injection." Applied catalysis, B: Environmental 17 (1998), 333–335). The method includes immersing alumina powder in a silver and tungsten nitrate water solution, followed by thermal treatment of the wetted powder in humidified air at 800° C. The powdery catalyst is then mixed with alumina sol and milled to into a slurry, forming the washcoat. The metallic monolith is the coated with 200 g/L of the washcoat and then calcined in air at 500–600° C. The catalyst is stable with regard to any water and $SO_2$ in the exhaust gases and provides for high activity toward $NO_x$ reduction with diesel fuel within a temperature window between 350 and 600° C. The catalyst performance is further improved when the diesel fuel reductant is pretreated over a partial oxidation catalyst to produce several hundred ppm of acetaldehyde in the exhaust gas. The publication mentioned above by Nakatsuji et al. also describes a method for partial oxidation of diesel fuel. FIG. 7 presents an example of $NO_x$ reduction curves plotted based on the data obtained in this publication.

For the conditions of the experiments shown in FIG. 7 the 200 cpsi catalyst monolith was tested with a diesel engine exhaust gas containing 900 ppm of $NO_x$, 11% $O_2$, 7% $H_2O$ and 40 ppm $SO_2$. The organic reductant obtained after partial oxidation of diesel fuel had a concentration of about 3,600 ppm taken as C1. The points in FIG. 7 correspond to the experimental data obtained at different space velocities of catalyst monolith. Space velocity is equal to the catalyst volume (L) divided by exhaust gas flow rate taken as L/h at normal conditions. The solid curves in FIG. 7 are obtained from a mathematical model, which estimates rate of reaction of $NO_x$ reduction and hydrocarbon oxidation. The model is described by the following system of equations:

$$\frac{dx_{HC}}{d\tau} = k_{o1} \exp(-E_1/RT)(1 - x_{HC}),$$

$$\frac{dx_{NO}}{d\tau} = a C_{o,HC}^n (1 - x_{NO}) \frac{1}{1 + k_{o2} \exp(-E_2/RT)} \frac{dx_{HC}}{d\tau},$$

where $x_{HC}$ and $x_{NO}$ conversion of hydrocarbon reductant and $NO_x$, respectively, $k_{o1}$: pre-exponent, $E_1$: activation energy of reaction of HC oxidation, T: absolute temperature, K; R: universal gas constant, a, and n empirical coefficients, $C_{o,HC}$: initial concentration of organic reductant, $k_{o2}$ and $E_2$: parameters, characterizing rate of inhibition of $NO_x$ reduction with increase in temperature.

The parameters of the model and dimensions are given in the following table.

TABLE 2

| Coefficient | Dimension | Value |
|---|---|---|
| k01 | $s^{-1}$ | $3.4 \times 10^8$ |
| $E_1$ | Cal/mole | 25,500 |
| A | — | 50.8 |
| N | — | 0.46 |
| $k_{o,2}$ | | $8.2 \times 10^7$ |
| $E_2$ | Cal/mole | 15,600 |
| R | Cal/mole/° K. | 1.987 |

Referring to FIG. 4, the process control in the discussed example is performed using a single thermocouple sensor 26 located under catalyst bed 18L in u-bend passage 46. The reductant is equally distributed between two injection ports 24, one in u-bend passage 46 and another in converter inlet 14. The total amount of reductant injected in each of the test modes is preset initially based on flow rate of the exhaust gases. The concentration of the reductant is thereby preset to be a constant 3000 ppm, during each operated mode. The preset amount of injected reductant is continuously corrected during the test based on the data from the control thermocouple sensor 26. Controller 28 uses the proportional change of the reductant stream according with the formula:

$$\Delta C = k(T_{catalyst} - T_{actual}),$$

where $\Delta C$ is correction in the concentration of the reductant injected, k: controller gain, $T_{catalyst}$: preset required temperature in catalyst bed, $T_{actual}$: actual temperature measured by temperature sensor 26. The coefficient k was preset to be equal 20 ppm/° C. The amount of reductant was then calculated from the corrected concentration $C_{corrected} = C_{preset} + \Delta C$, and the exhaust flow rate in each mode.

Figure 8:
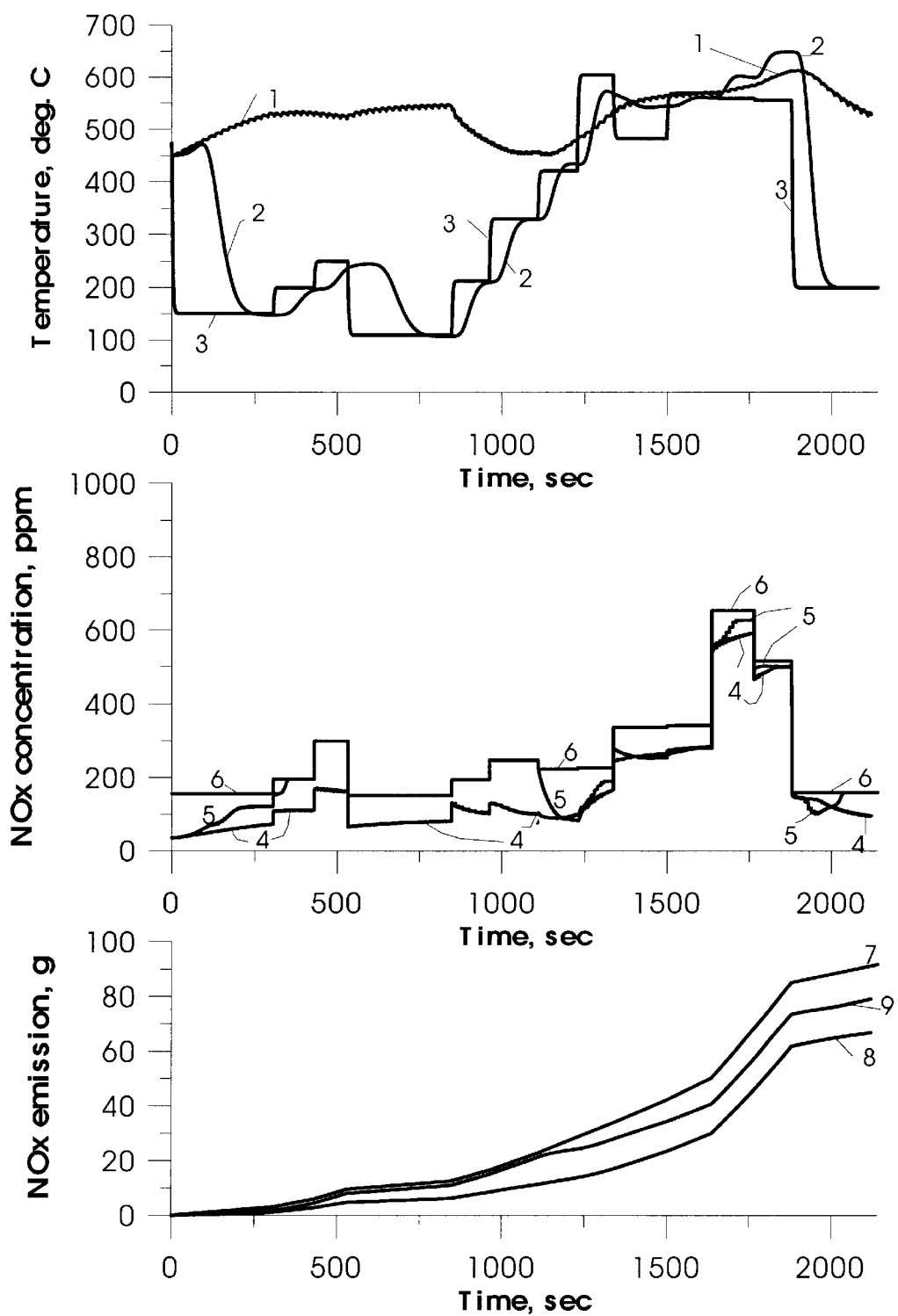

FIG. 8 characterizes the behavior of a flow reversing and a non-flow reversing converter during the standard test. The reversing converter is operated with a continuous series of cycles with a period between valve switching equal to 10 sec and total cycle period 20 sec. The transient curves in FIG. 8 were determined based on a two-phase model of a fixed bed reactor. The model is described in equations (8)–(10) in Reference 1 below. The heat and mass transfer parameters of metallic monolith were obtained from Reference 2, while the catalyst kinetics were approximately described by the two equations given above regarding the derivatives of HC and $NO_x$ conversion. The kinetic parameters are listed in Table 2.

REFERENCES

Matros, Yu. Sh. and G. A. Bunimovich, "Reverse-Flow Operation in Fixed Bed Catalytic Reactors.", Catalysis Review—Science Engineering, 1996, 38 (1), 1–68.

Day, J. P., "Substrate Effects on Light-Off. Part II, Cell Shape Contribution, SAE paper 971024, 1997.

Curves 1 and 2 in FIG. 8 represent the predicted temperature in the connecting space of the converter where temperature sensor 26 is located. Curve 1 corresponds to reversing flow operation while curve 2 to conventional operation without flow reversing. Curve 3 represents the temperature of exhaust gases in the converter inlet. Curves 4 and 5 show the $NO_x$ concentration in the outlets for flow reversing and non-flow reversing converters, respectively, while line 6 is inlet concentration of $NO_x$ after the engine. FIG. 8 also shows increase in the emission of $NO_x$ cumulated during the test time. This emission was calculated based on $NO_x$ concentration and flow rate for inlet exhaust gas (curve 7) and outlet gas after flow reversing and non-flow reversing converters (curves 8 and 9, respectively). According with the test procedure, the engine is initially warmed up, preheating the catalyst bed to 450° C. This initial temperature is within the temperature window of the lean-$NO_x$ catalyst applied, so the controller 28 begins to periodically switch flow direction and the reductant is supplied to the inlet and middle part of the converter in the amount corresponding to total concentration in the exhaust gas 3000 ppm. After beginning the test, the exhaust temperature quickly falls to 150° C. according with a preset engine load and speed in mode # 1 (Table 1). Thereafter the temperature of the exhaust gases and inlet concentration of $NO_x$ (curves 3 and 6, FIG. 8) change in a step-wise fashion according with the engine parameters prescribed by the other 12 modes of the test (Table 1). Total $NO_x$ amount cumulatively produced during the test (curve 7, FIG. 8) gradually increases up to about 90 g.

The temperature in the conventional non-flow-reversing converter (curve 2, FIG. 8) closely follows the temperature of the exhaust gases. Therefore, this converter is cooled down quickly during mode 1 and than remains at low temperature for a half of the test time during modes 2–6. The conventional converter also loses heat quickly during the last test mode 13. In highly loaded modes 11 and 12, the converter temperature exceeds that of the exhaust gases. This kind of temperature behavior leads to very low $NO_x$ conversion during the low load modes, because the temperature in catalyst bed lies below the temperature window at which the catalyst is effective for $NO_x$ reduction. At highly loaded modes of engine operation, the actual temperature of the catalyst in the catalyst bed is higher than the catalyst operating window and that also contributes to low $NO_x$ reduction efficiency. With the conventional converter, as it can be seen by comparing curves 7 and 9 in FIG. 8, total $NO_x$ emission is only 13% below the inlet exhaust emission.

Curve 1 (FIG. 8) demonstrates that reversing the flow through the converter makes it possible to retain the temperature within the catalyst temperature window both at low and high load of engine operation. Comparing curves 6, 4 and 5 in FIG. 8 shows that the $NO_x$ reduction efficiency in a reversed flow converter exceeds that of conventional converter during all modes of test. The $NO_x$ reduction efficiency for flow reversing operation is as much as 50% during low load modes 2–6 while the conventional converter does not indicate any appreciable $NO_x$ reduction at all. Some conversion gain is also indicated for flow reversing operation at highly loaded modes 11 and 12. Over the entire test, the reversing flow converter provides for $NO_x$ emission reduction by 26% thus increasing the $NO_x$ removal efficiency by two times compared with the conventional converter. As other calculations show, this gain can be higher at higher amounts of catalyst or higher catalyst activity with regards to $NO_x$ reduction.

FIG. 8 also illustrates potential benefits of using the present invention in its second, third and fifth embodiments of the invention (FIGS. 2, 3 and 5), which combine a soot trap with lean-$NO_x$ catalysts. The ability of a reversing flow converter to retain high temperature in the center of a packed bed allows for continuously maintaining a high temperature in the soot trap installed between the beds of $NO_x$ reduction catalyst. Maintaining sufficiently high temperatures by controlling the amount of injected reductant creates favorable conditions for continuous or periodic combustion of soot accumulated in the trap.

EXAMPLE 2

In this example, the converter with the configuration shown in FIG. 3 is installed in a passenger vehicle with diesel engine having a 2-L displacement volume. The engine and converter are tested in a dynamometer for a European Motor Vehicle Emission Group standard test procedure for light-duty vehicles. This procedure includes a continuous transient change of engine speed for a 1200 sec test time and models low load urban driving with frequent idling, accelerating and decelerating. When the test begins, the engine and converter are cold and the exhaust gases have a temperature below 100° C. during first 60 sec. The following 1000 sec of the test correspond to low torque operation and the temperature of the exhaust gases does not exceed 300° C. during this extended time. During the last 150 sec of the test, the engine load increases sharply, causing the temperature of the exhaust gases to rise to 500° C. The gas flow rate after the particular engine considered in this example is about 150 L/sec for the low load fraction and then increases up to 80 L/sec during the last fraction of the test. The $NO_x$ concentration averages about 100 ppm at the initial fraction of the test and increases up to several hundred ppm during about 50 sec of the loaded test fraction. The concentration of the hydrocarbons in the exhaust gases does not exceed 100 ppm at any time.

According to FIG. 4, the converter includes a cylindrical ceramic block 18L of a supported noble metal, lean $NO_x$ catalyst and a similar block of inert non-catalytic material placed above the catalyst. The diameter of each monolith is 8 inches (203 mm). The length of the catalyst bed is 6 inches (152 mm). Total volume of catalyst is 5 L. The length of inert block was varied between 0 to 6 inches. The catalyst and inert blocks are formed from cordierite and have a standard cell density 200 CPSI. The channels for gas passage through the inert monolith have square cross-section with each side being about 1.5 mm. The size of the channels in the catalytic monolith is reduced by 0.1 mm due to the thickness of catalyst washcoat. The washcoat includes Pt/-$Al_2O_3$ prepared through incipient wetness impregnation and has a 2% platinum loading. This catalyst provides for $NO_x$ reduction within a temperature window between 150 and 350° C. With diesel fuel used as a reductant the maximum $NO_x$ conversion is observed at temperature around 220° C. and at a ratio between numbers of moles of diesel fuel reductant taken as HC and $NO_x$ equal to 6 with $NO_x$ concentration about 500 ppm. The absolute number for the $NO_x$ conversion at space velocity 40,000 $h^{-1}$ is in the range of 30%. The catalyst is stable with regard to water and $SO_2$ in diesel exhaust gas.

The converter as shown in FIG. 4 was studied with and without periodic flow reversal using similar mathematical model described in the Example 1. The concentration of hydrocarbons in the inlet of the converter was maintained fixed at 2400 ppm. In some modeling runs the reductant was injected only in the inlet of the converter, while in other runs it was injected also through port 24 in U-bend passage 46. Equal feed of hydrocarbon reductant was assumed in both injection points. The flow reversals and reductant feeding was set to begin after the temperature of exhaust gases (FIG. 4) reached 200° C. The period of flow reversal was equal to 20 sec. Table 3 illustrates the $NO_x$ conversion results with and without flow reversal at different lengths of inert monolith and different number of injection points.

TABLE 3

| Run # | 1 | 2 | 3 | 4 |
|---|---|---|---|---|
| Number of injections | 1 | 2 | 2 | 2 |
| Height of inert bed, inches | 0 | 0 | 3 | 6 |
| $NO_x$ conversion | | | | |
| non-reversing | 11 | 12 | 13 | 13 |
| reversing | 16 | 19 | 24 | 27 |

Similar to Example 1, Table 3 shows an increase in $NO_x$ conversion for flow reversing operation compared with the traditional non-reversing operation. The reversing flow converter may provide for as much as 1.5–2 times more $NO_x$ reduction depending on the volume of inert material and number of injection points. The benefits of flow reversing are increased with increased ceramic material length and by using a distributed reductant injection.

In view of the above, it will be seen that the several objects of the invention are achieved and other advantageous results attained. As various changes could be made in the above method and constructions without departing from the scope of the invention, it is intended that all matter contained in the above description or shown in the accompanying drawings shall be interpreted as illustrative and not in a limiting sense.

What is claimed:

1. A method for substantially reducing the amount of $NO_x$ in exhaust gases from a fossil-fueled engine, using lean-burn combustion, said exhaust gases containing $NO_x$ and other noxious materials including hydrocarbons, carbon monoxide, carbonaceous particulate matter and mixtures thereof, the method comprising
   (a) selecting a catalyst which is effective for $NO_x$ reduction to $N_2$ in an oxidizing environment through the reaction of $NO_x$ with a chemical reductant, said catalyst being effective with regards to said $NO_x$ reduction within a certain temperature window and at a molar ratio between the amounts of chemical reductant and $NO_x$ above a certain minimum ratio at which said catalyst is effective with respect to $NO_x$ reduction,
   (b) passing the exhaust gases through a converter including a catalyst bed with said catalyst,
   (c) heating up or cooling down the catalyst bed thereby maintaining the temperature inside the catalyst bed within the temperature window at which the catalyst is effective with respect to $NO_x$ reduction,
   (d) adding a chemical reductant to the exhaust gases thereby maintaining the ratio between the molar amounts of chemical reductant and $NO_x$ above the certain minimum ratio at which said catalyst is effective with respect to $NO_x$ reduction,
   (e) periodically reversing the flow of the exhaust gases through the catalyst bed thereby improving the catalyst bed heat retaining ability and extending the time during which the catalyst bed is within the temperature window at which the catalyst is effective with regards to $NO_x$ reduction.

2. The method of claim 1 wherein the catalyst bed is placed between two beds of a gas permeable material, said material being catalytically inactive with respect to catalytic reactions with the exhaust gases and serving for heat retention and regenerative heat exchange.

3. The method of claim 1 wherein the catalyst is a lean-$NO_x$ catalyst which is effective in $NO_x$ reduction to $N_2$ through the reaction with organic chemical reductant selected from the group consisting of linear, cyclic and aromatic hydrocarbons, aldehydes, alcohols and ketones, diesel fuel, gasoline, and mixtures thereof or wherein the catalyst is a selective catalytic reduction catalyst which is effective for $NO_x$ reduction to $N_2$ through the reaction with nitrogen containing reductant selected from the group consisting of ammonia, urea and mixtures thereof.

4. The method of claim 3 wherein said catalyst is a high temperature lean-$NO_x$ catalyst based on ion-exchanged zeolite which has temperature window for efficient $NO_x$ reduction between 250 and 500° C.

5. The method of claim 3 wherein said catalyst is a noble metal lean-$NO_x$ catalyst containing platinum, rhodium or palladium or mixtures thereof.

6. The method of claim 3 wherein said catalyst bed is divided into two parts and said organic reductant is added to the exhaust gases upstream of an inlet to the catalyst bed in the converter and between said two parts of the catalyst bed.

7. The method of claim 3 wherein said catalyst is a high temperature alumina supported or an aluminate based lean-$NO_x$ catalyst, having a temperature window for efficient $NO_x$ reduction between 350 and 700° C.

8. The method of claim 7 wherein said catalyst is a high temperature lean-$NO_x$ catalyst based on highly acidic gamma alumina.

9. The method of claim 3 wherein the catalyst bed is divided by two parts and a soot trap is installed between said two parts of catalyst, said trap being capable of collecting carbonaceous particulate matter and withstanding heating above a certain temperature limit, at which the collected carbonaceous particulate matter is burned thereby regenerating said trap.

10. The method of claim 9 wherein said adding of organic reductant to the trap provides for continuously maintaining said trap above the certain temperature limit, at which the collected carbonaceous particulate matter is burned.

11. The method of claim 10 wherein said adding of chemical reductant is performed with periodical increase in the amount of reductant added, thereby providing for periodical temperature increase inside said trap above the certain temperature limit at which the collected carbonaceous particulate matter is burned.

12. The method of claim 10 wherein said soot trap is divided by two parts and additional chemical reductant as hydrocarbons are added to the exhaust gases in the inlet of the catalyst bed and to said two parts of the trap.

13. A converter for substantially reducing the amount of $NO_x$ in exhaust gases from a fossil-fueled engine, using lean-burn combustion, said exhaust gases containing noxious materials including $NO_x$, hydrocarbons, carbon monoxide, carbonaceous particulate matter and mixtures thereof, said converter comprising a container with an inlet and an outlet for the exhaust gases and a catalyst bed, a switching valve for periodically reversing the flow of the exhaust gases through the catalyst bed by reversing the flow between the inlet and the outlet of the container, said catalyst bed having a catalyst which is effective for $NO_x$ reduction to $N_2$ through the reaction of $NO_x$ with a chemical reductant, said catalyst being effective with regards to said $NO_x$ reduction within a certain temperature window and at a molar ratio between the amounts of chemical reductant and $NO_x$ above a certain minimum ratio at which said catalyst is effective with respect to $NO_x$ reduction, means for heating up or cooling down the catalyst bed thereby maintaining the temperature inside the catalyst bed within the temperature window at which the catalyst is effective with respect to $NO_x$ reduction, a reductant delivery system for adding chemical reductant to the exhaust gases thereby maintaining the ratio between the molar amounts of chemical reductant and $NO_x$ above the certain minimum ratio at which said catalyst is effective with respect to $NO_x$ reduction, the catalyst bed being divided into two parts and a soot trap is provided between said two parts of catalyst bed, a first catalyst bed on the inlet side of the converter and a second catalyst bed on the outlet side of the converter, said trap being capable of collecting carbonaceous particulate matter and withstanding heating above a certain temperature limit, at which the collected carbonaceous particulate is burned thereby regenerating said trap.

14. The converter of claim 13 wherein the reductant delivery system adds chemical reductant to the exhaust gases before or as the exhaust gases flow through the catalyst bed on the side of the converter serving as the inlet as the exhaust gases are reverse flowed through the converter and as the exhaust gases flow through said filter.

15. A converter for substantially reducing the amount of $NO_x$ in exhaust gases from a fossil-fueled engine, using lean-burn combustion, said exhaust gases containing noxious materials including $NO_x$, hydrocarbons, carbon monoxide, carbonaceous particulate matter and mixtures thereof, said converter comprising a container with an inlet and an outlet for the exhaust gases and a catalyst bed, a switching valve for periodically reversing the flow of the exhaust gases through the catalyst bed by reversing the flow between the inlet and the outlet of the container, said catalyst bed having a catalyst which is effective for $NO_x$ reduction to $N_2$ through the reaction of $NO_x$ with a chemical reductant, said catalyst being effective with regards to said $NO_x$ reduction within a certain temperature window and at a molar ratio between the amounts of chemical reductant and $NO_x$ above a certain minimum ratio at which said catalyst is effective with respect to $NO_x$ reduction, means for heating up or cooling down the catalyst bed thereby maintaining the temperature inside the catalyst bed within the temperature window at which the catalyst is effective with respect to $NO_x$ reduction, a reductant delivery system for adding chemical reductant to the exhaust gases thereby maintaining the ratio between the molar amounts of chemical reductant and $NO_x$ above the certain minimum ratio at which said catalyst is effective with respect to $NO_x$ reduction, the catalyst bed having a high temperature lean-$NO_x$ catalyst bed flanked by soot traps, said traps further flanked by low temperature lean-$NO_x$ catalyst beds on the inlet and outlet sides of the converter.

16. The converter of claim 15 wherein the reductant delivery system adds chemical reductant to the exhaust gases before or as the exhaust gases flow through any or all of the catalyst beds and soot traps.

* * * * *